Sept. 16, 1969  R. E. BOWLES  3,467,121
DUAL FLUID SYSTEMS
Filed Oct. 21, 1965  3 Sheets-Sheet 2

INVENTOR
ROMALD E. BOWLES

BY Hurvitz & Rose
ATTORNEYS

INVENTOR
ROMALD E. BOWLES

BY Hurvitz & Rose
ATTORNEYS

United States Patent Office 3,467,121
Patented Sept. 16, 1969

3,467,121
DUAL FLUID SYSTEMS
Romald E. Bowles, Silver Spring, Md., assignor to Bowles Engineering Corporation, Silver Spring, Md., a corporation of Maryland
Filed Oct. 21, 1965, Ser. No. 499,781
Int. Cl. F15c 1/10, 1/15
U.S. Cl. 137—81.5                                35 Claims

ABSTRACT OF THE DISCLOSURE

Mass flow in fluid devices is controlled by causing a first fluid to flow through a nozzle at the sonic velocity of the first fluid and introducing upstream of the nozzle variable quantities of a second fluid having a different sonic velocity characteristic. Additional applications are disclosed wherein the differences in sonic velocities of different fluids are employed to control mass flow and transit times of fluid flows.

---

The present invention relates to fluid systems and, more particularly, to a method and apparatus for modulating fluid flow through a system without the use of moving parts.

Pure fluid devices, in which the delivery of a high energy main flow is controlled by means of lower energy control flows, are well known in the art for their ability to carry out many mechanical functions including the modulation of fluid flow; that is, the variation of fluid flow, without the use of moving parts. In one type of these prior art devices, the main stream of fluid is received by one or more receiving ducts after being deflected by interaction with one or more control streams. The proportion of the main stream within a receiving duct can thus be modulated by directing the main stream to the opposite duct or to a dump.

Another type of pure fluid device is the vortex fluid amplifier. In this device, the amount of fluid exiting a central aperture of a circular vortex chamber is actually restricted and thus modulated in accordance with the degree of rotation of the vortex field, which rotation is induced by control flows acting against the main flow so as to change the angular rate of rotation of the output flow. Thus, in each of these devices just mentioned, as well as in other fluid modulators without moving parts known to me, the fluid modulating function is performed by control flow and pressure fields interacting with the main stream.

It is desirable in many instances that fluid flow modulation be performed by pure fluid devices of simpler configuration or over longer lengths of flow passageway without high power consumption. Therefore, according to the present invention, I have provided a method and apparatus whereby modulation is accomplished by a pure fluid element utilizing characteristics associated with control of the speed of sound in the fluid. Further, the present design is very simple so that the operation is uncomplicated and quite efficient.

According to the present method and apparatus, I take advantage of a phenomenon that I first encountered during my work on sonic liquid oscillators when I was unable to achieve frequencies as high as expected and again encountered later when efforts to use the speed of sound in a liquid as a measure of temperature failed. It became evident that air bubbles entrapped in the liquid had drastically reduced the speed of sound in both of these cases, far below the linear interpolation value of the apparent mixture.

To take advantage of this phenomenon in providing fluid flow modulation, I provide an unobstructed throat through which fluid flows as the result of a pressure difference across the nozzle. At sonic velocity, the fluid flow through this throat is said to be choked since, in accordance with well known physical principles, the velocity can never exceed sonic or Mach I velocity at the throat even if the pressure upstream is markedly increased. To explain further, suppose a stream of compressible fluid is accelerating from rest to some supersonic speed due to a given pressure differential across the throat in a channel. Then initially, it is apparent from the conservation of mass relationships that the contraction to the throat results in a speedup of the fluid until the Mach number becomes unity. For the fluid speed to further increase, the channel cross-sectional area must increase rather than decrease since, at supersonic speeds, the fluid density decreases more rapidly than the speed increases, thus requiring a greater cross-sectional area to pass a given mass flow. Accordingly, a speed greater than Mach I can never be achieved in a throat operating in a choked condition regardless of the amplitude of the differential pressure across the nozzle.

By combining these two teachings just described in a novel manner, I propose to provide a very simple method and apparatus to control the velocity, the mass flow rate and the propagation time of a fluid signal in a fluid system. Essentially, a channel is provided with primary fluid flowing therethrough. A secondary material, that has a speed of sound different from the primary fluid flowing in the system, is injected into the channel whereby the speed of sound in the mixed stream is varied in accordance with the amount of secondary material introduced. It follows that, since the speed of sound is a primary parameter of fluid flow in the system, the propagation characteristics of signals within the fluid flow and the velocity and mass flow rate at choked nozzle throats can be easily and efficiently regulated by injecting into the system different amounts of secondary material. In the preferred embodiment, the secondary fluid is injected into the system through a mixing orifice array positioned within the main stream, said secondary fluid being injected into the system by suitable differential pressure modulated as desired.

Generally speaking, the best results to date in utilizing my invention have been obtained where the primary fluid is in a different phase from the control material and said material is a fluid, because of the drastic change in speed of sound that takes place under such conditions, in accordance with the phenomena outlined above. In this situation, a very small amount of injected secondary fluid has a very great effect on the flow rate of the main fluid stream so that a very high level of pure fluid amplification is realized. In other words, a small change in the amount of secondary fluid injected produces a very large flow modulation in the main stream, in accordance with the invention. Therefore, the preferred embodiment to be explained herein refers to the fluid multiphase situation, where water and air or similar combinations of liquids and gases are used. It is to be understood, however, that the present invention contemplates systems wherein the primary fluid and the control or secondary material are the same fluid in different phases such as water and steam, or where primary and secondary materials are different materials in different and changing phases such as air in a gas phase and carbon dioxide fragments in a solid phase, or where the primary fluid and the control or secondary material are in the same phase but have different acoustic speed characteristics, such as hot and cold water, air and helium or nitrogen and hydrogen. In the latter type of system, however, the change in the speed of sound is not as drastic as in the multiphase situation, discussed above which in many cases is desirable since small changes in speed of sound are all that is desired. The invention further contemplates the use of a secondary material comprising a fine dust, spheroids or frit; that is, having solid rather than fluid particles, to be injected into the main stream of fluid for control. Also, it is clear that any number of different fluids or solids can be used for various desired results in accordance with the invention. It should be noted that thorough mixing of the two materials is preferable so that uniform results may be obtained. It has been found that it is desirable in liquid-gas systems particularly that the addition of certain agents such as detergents assist in the mixing phenomena and results in systems of excellent uniformity of performance.

Accordingly, it is one object of the present invention to proved a method and apparatus for modulating fluid flow in a fluid system.

It is another object of this invention to provide a novel modulating technique and modulator resulting in performance of the same caliber as the prior art fluid devices but which do not require conventional control streams.

It is still another object of this invention to provide a method and apparatus for controlling fluid mass flow and fluid propagation time without moving parts in an efficient manner.

It is still a further object of this invention to provide a method and apparatus for performing the same, for modulating fluid flow by pure fluid means without requiring fluid amplifier structures with control nozzles and plural receiving ducts and in which flow input rates to the system may be effectively throttled when desired.

It is still another object of the present invention to provide a fluid modulator that is highly sensitive, relatively cheap to manufacture and that has the interminate life usually attributed to pure fluid elements.

The above and still further objects, features and advantages of the present invention will become apparent upon consideration of the following detailed description of one specific embodiment thereof, especially when taken in conjunction with the accompanying drawings, wherein:

Figure 1:
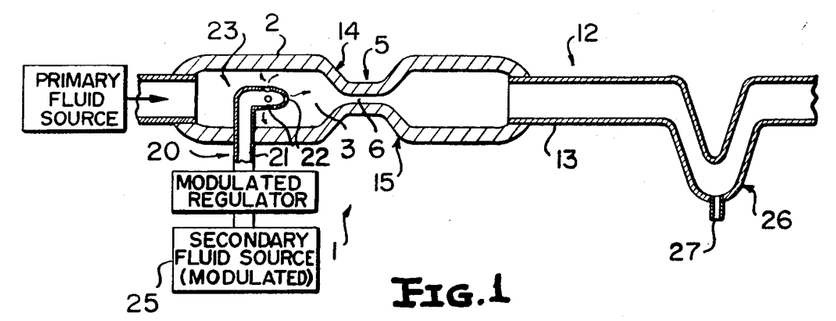
FIGURE 1 is a cross-sectional view of a device constructed in accordance with the present invention.

Referring now to FIGURE 1 of the drawings, there is disclosed a fluid flow modulator of the present invention, generally represented by the numeral 1. The fluid modulator 1 is a channel 2 having a throat section 5 therein defining an inlet chamber 3 and an outlet chamber 4, located upstream and downstream, respectively, of the throat 6. The throat section 5 has a restricted passage 6 connecting the chambers 3 and 4. Inlet means 10 is provided at the end of the chamber 3 opposite the throat section 5 and is or may be constructed of a conventional pipe member 11. An outlet means 12 is provided at the other end of the body 2 and also is or may be constructed of a pipe member 13. The device may be cylindrical or planar as desired.

In operation, fluid enters the inlet means 10, passes through the chamber 3 and is accelerated by converging portion 14 of said chamber 3. The system is designed to operate some of the time in a choked condition so that whenever the fluid reaches the speed of sound or Mach I velocity at the throat section 5, the fluid flow through said section is restricted as discussed above. Downstream of the throat section 5 is a gradually diverging section 15, which can effect further acceleration or deceleration of a compressible fluid or fluid mixture passing through the system in accordance with known phenomena. Thence, the fluid passes through the chamber 4 and exits the modulating system 1 via the outlet pipe 13.

As previously indicated, an object of this invention is to control the fluid flow through the modulator 1. Accordingly, a control or operating means 20 is provided for selectively regulating the flow of fluid through the system. The control means 20 includes a nozzle 21 with any number of apertures 22 formed in a generally closed terminal portion 23, which portion 23 is positioned generally centrally of the inlet chamber 3. The nozzle 21 is designed to disperse secondary fluid into the primary fluid flow through the chamber 3 so that fluid entering through the nozzle 21 is completely combined with the fluid in chamber 3 before the combined flow reaches the critical throat section 5. It has been found that in some instances the secondary fluid from source 25 at atmospheric pressure can be properly injected into tthe system merely by the sucking action of the main stream as it flows past the apertures 22 of the nozzle 21. Alternatively, the secondary fluid source 25 may be supplied at an increased pressure if the sucking action caused by the main stream velocity is not sufficient to provide a differential pressure capable of drawing the fluid into the system at the required rate. Alternatively, the secondary fluid supply pressure may be modulated to provide a desired input signal to the modulator 1.

The operation of the unit is very simple and should now be evident to those skilled in the art. As previously indicated, my invention contemplates the use of liquids, gases, or even fine solid particles as the working medium. Therefore, while the unit will now be specifically described as operating on water as the main stream and air as the secondary fluid to modulate or control the main stream flow, it should be understood that the unit can be operated on any type of fluid, whether the fluid is in the form of a liquid, a gas, or a combination of the two with a secondary material of liquid, gas, solid, or a combination.

Figure 2:
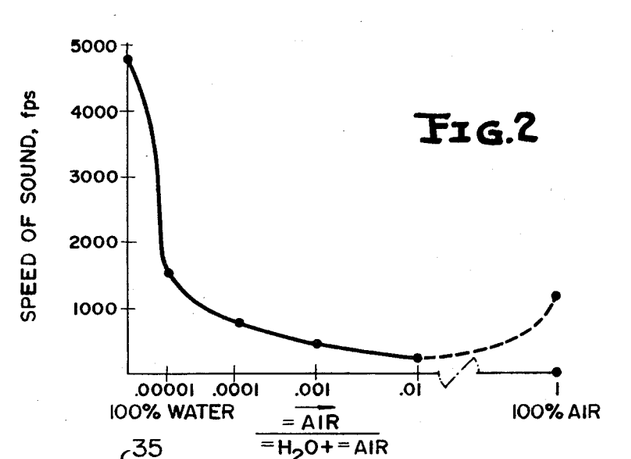
FIGURE 2 is a graphical illustration of the variation of speed of sound in an air-water system as a function of variation of the ratio of air-to-water and air.

The fluid, such as water, is introduced into the system through the pipe 11 at a pressure that is sufficient to cause the pressure ratio between the inlet 10 and the outlet 12 to be at least equal to the critical ratio to cause sonic velocity at the throat section 5 when the lowest sonic speed exists due to the combination of secondary and primary fluid loss. Assuming that no secondary fluid is being injected into the system at first, the speed of sound in water is approximately 4800 feet per second. The pressures required to provide such flow are beyond the current state of the art of hydraulic systems and consequently the pressure drop across the modulator 1 establishes the flow rate and, in this case, the unit is not operating in a choked condition. When it is wished to vary the fluid flow rate through the system, secondary fluid, such as air, is injected through the nozzle 21 into the inlet chamber 3. While the secondary fluid in the preferred embodiment is air, it is only necessary for proper operation of the device for the material selected as the secondary material to have compressibility or speed of sound characteristic sufficiently different (lower speed of sound and greater compressibility in the case under consideration) from the fluid that makes up the main stream, as previously described. As the air enters the main stream of water in the form of bubbles, the speed of sound in the mixture is drastically reduced as illustrated in FIGURE 2, as a result of the tremendous change of compressibility of the fluid occasioned by addition of a small amount of air and, if sufficient air is introduced, causes the throat 5 to choke thereby reducing the velocity and density of the fluid flowing through the restricted passage 6 in accordance with my discovery. Accordingly, the mass flow rate through the throat section 5 is reduced and the propagation time for any fluid signal within the fluid mixture downstream of said nozzle 21 is also drastically reduced.

The preferred embodiment of the present invention can be better understood by referring briefly to FIGURE 2, where the relationship of the speed of sound to the make-up of the air-water mixture is illustrated. Thus, assuming that the critical pressure ratio across the inlet and outlet means 10, 12 is applied to the unit, the corresponding velocity of flow through the throat 5 ranges from approximately 65 feet per second when 0.1% by weight of air is injected, up to over 4000 feet per second when 100% water is flowing in the system. Thus, as can be seen, it is possible in accordance with the present invention to effect a large variation in mass flow rate in response to the injection of a very small amount of secondary fluid. This then is the outstanding feature of the present invention, and as previously stated, by properly selecting the combination of fluids to be used in a given system, almost any desired modulation of fluid flow through the system can be realized in response to a change in the composition of the mixture flowing through the throat 5. Many uses of the phenomenon of this invention in pure fluid circuits and elements, will be evident to those skilled in this art. A few such uses will now be described to point out the importance, as well as the versatility of my invention.

As one example of the use of tthe system of the present invention, reference is made again to FIGURE 1 of the accompanying drawings.

One of the difficulties with pure fluid systems of the beam deflection and vortex types is that, even during standard conditions of operation, the devices consume large quantities of primary fluid. In most situations, this does not present a problem but, when the devices are being operated from compressed air tanks, for instance, only a limited supply is available and it is desirable to limit the drain on the system if possible. The apparatus of FIGURE 1 may be employed for such purposes if desired.

Specifically, the source 10 of FIGURE 1 now becomes an air supply and the source 25 becomes a water supply, in one example. When the device is to operate normally, no water is introduced but when it is desired to reduce air consumption, water is introduced through nozzles 21 and the throad 6 becomes choked materially reducing air flow therethrough.

If desired, most of the water introduced may be separated from the air by centrifugal action by a bend 26 in the pipe 13, having a drain 27 at its lowermost point. The remaining water introduces no more problems than a normal air supply but, if desired, a desicoant chamber may be added downstream of the bend 26 in the pipe 13.

Figure 3:
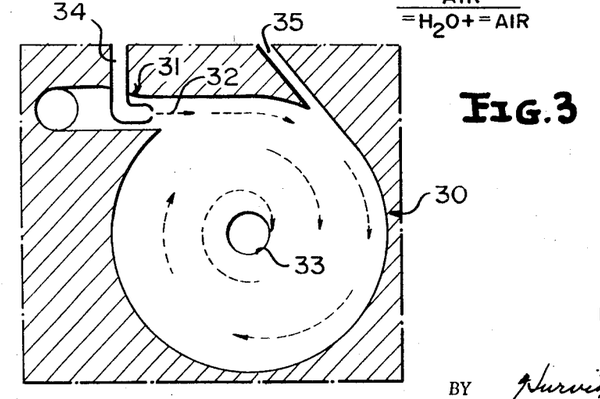
FIGURE 3 is a schematic diagram of another embodiment of the present invention utilizing a vortex amplifier.

Referring now specifically to FIGURE 3, there is illustrated a schematic diagram of a vortex device 30, which in itself is a fluid flow modulator, as previously explained, said device having an inlet means 31 with a nozzle exit portion 32. As is generally well known in the art, a fluid stream enters the vortex device 30 from the exit 32 of the inlet means 31 and follows a generally circular path due to the tangential orientation of said exit 32 to said device 30; said flow path being generally illustrated by the dotted line flow arrows in the figure. As the stream spirals toward an outlet aperture 33, the velocity of said stream increases to conserve angular momentum and the flow from said aperture 33 is restricted as the velocity of the stream increases. According to the present invention, a secondary fluid is injected into the system at a control means, said injection may be just upstream of the nozzle exit 32 of the inlet means 31, as schematically indicated by the solid flow arrow 34 in the figure or said injection may be by a separate nozzle 35 discharging directly into the vortex chamber.

As in the embodiment of FIGURE 1, a Mach I limit condition exists for a maximum velocity within the vortex device 30. This limit velocity occurs at a radius dependent upon the flow angular momentum and supply conditions. If the primary fluid is chosen to be air, the velocity is approximately 1100 feet per second when there is zero secondary fluid injection at the control means 34. With the addition of liquid, such as water, into the system as a secondary fluid, then the velocity of sound distribution within the system drops to a minimum value of the order of 65 feet per second, as in the embodiment of FIGURE 1, causing the sonic limit condition to occur at a larger radial location and so change the vortex amplifier equilibrium conditions. Thus, the addition of water will reduce the mass flow rate of the primary fluid, air, and change the amplitude of signal indicated by the vortex amplifier readout device of which many types are known to the art and some of which are described in copending application Ser. No. 439,500, filed Feb. 23, 1965, by R. E. Bowles et al. for "Fluid Amplifier."

As previously indicated, the device of my invention may utilize any combination of fluids and/or liquids as the working mediums. In the embodiment of FIGURE 3, if the primary fluid is a liquid and the control fluid is a gas instead of vice versa, as just described, a similar reduction of speed of sound will result as air, for example, is added to water. In this case, an additional advantage results from the tendency of centrifugal force field to drive the lower density air to the outlet aperture 33 faster than the higher density water. This action increases the air to water mass ratio at the smaller radii and causes the control signal to be more effective in throttling or modulating the liquid flow than it would be if the vortex chamber fluid mixture remained homogeneous. However, the result, in either of the cases described, is that for pressure differences between supply and discharge sufficiently large to produce sonic flow within the vortex chamber under the operating conditions, the addition of the secondary fluid reduces the primary fluid flow rate in drastic proportions and thus will modulate the flow rate of primary fluid and the amplitude of the outlet signal of the vortex device 30 in amplified proportions.

Figure 4:
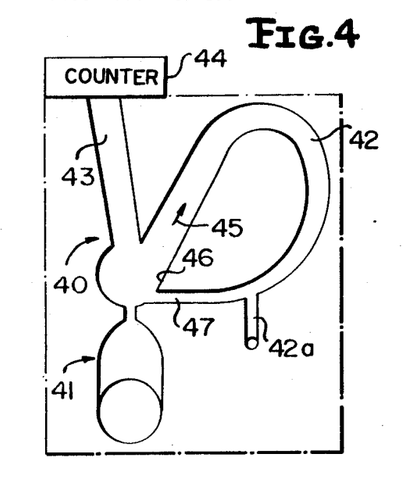
FIGURE 4 is a schematic diagram of an embodiment of the present invention for generating an oscillating signal.

Another important application of the device of the present invention is illustrated in FIGURE 4 and comprises a feedback oscillator 40 having an inlet means 41, a feedback channel 42 with a bleed outlet 42a, an outlet channel 43 and a counter 44. A control means is schematically illustrated by the flow arrow 45, which is adapted to inject secondary fluid into the feedback channel 42. In operation, the primary fluid flow, such as air, drives the oscillator 40 at an established frequency. If the speed of sound of the fluid flowing within the oscillator feedback channel 42 is changed, then the oscillator frequency will change accordingly, due to the change in the propagation time of the fluid signal through the feedback channel 42. As previously indicated in discussing FIGURE 1, the propagation time of the fluid flow downstream of the injector can be regulated by the injection of secondary fluid. In the present situation then, secondary fluid is injected into the system, as indicated by flow arrow 45, and the pulse rate output in output channel 43 and the subsequent count rate register at the counter 44 is changed. The change, of course, is a function of the mixture ratio established in channel 42 by the amount of secondary control fluid flow, such as water, from the control nozzle 45, in accordance with the graphical illustration of FIGURE 2.

The operation of the oscillator of FIGURE 4 is conventional in all other respects. Boundary layer effects along the right sidewall 46 of the device initially deflect the power stream to the feedback passage 42. After the resulting fluid signal travels around the path 42, it issues from control nozzle 47 into the region between power jet and sidewall 46 and deflects the power stream to channel 43. When the feedback signal (flow or pressure wave) has reduced sufficiently, boundary layer effects between sidewall 46 and the stream cause the stream to switch back to the channel 42 and the cycle is repeated. The injection of fluid through means 45 changes the time required for the fluid signal to travese the feedback path 42 and therefore changes the frequency of oscillation.

Figure 5:
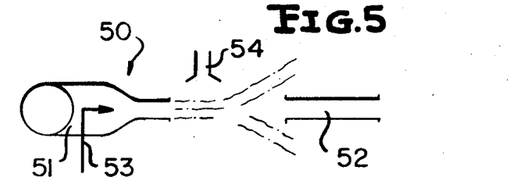
FIGURE 5 illustrates an application of the present invention to a turbulence amplifier.

The apparatus of the present invention may also be used as a control or regulation for a turbulence amplifier, as illustrated in FIGURE 5. The turbulence amplifier 50 comprises an inlet means 51 having a subsonic orifice, a receiving duct 52 and a secondary injection nozzle as represented by the flow arrow 53.

As is well known to one skilled in the art, the stream 54 in a turbulence amplifier, in a null control condition, remains laminar downstream of the input means 51 until it is received at the receiving duct 52, if the Reynolds number of the fluid flow is sufficiently low and the duct 52 is appropriately placed. In accordance with the present invention, the controlled injection of secondary fluid into the primary fluid at location 53 increases the susceptibility of the stream to turbulence. The amount of secondary fluid injected may be such that turbulence in the absence of a control stream is not produced or is produced. In the former case, the secondary fluid varies (increases) the gain of the device since it reduces the flow required to be introduced by an input pasage 54 required to initiate turbulence. In the latter case, the secondary fluid supply is the control source since variations in fluid introduced thereby varies the point between passages 51 and 52 at which turbulence occurs and correspondingly varies the output signal in passage 52.

Figure 6:
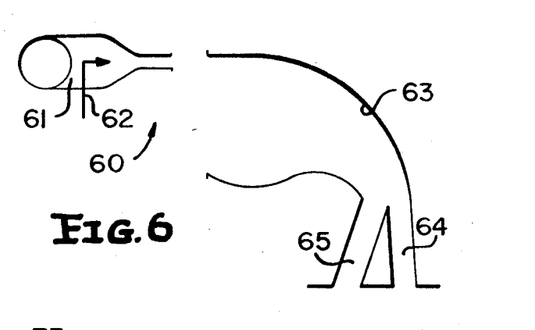
FIGURE 6 illustrates a device for separating the high and low density fluids into separate output signals in a device constructed in accordance with the present invention.

In FIGURE 6, there is provided a fluid modulator 60 having an inlet means 61 and a control or injection means indicated by the flow arrow 62. As in the previous embodiments, the secondary fluid from the control means 62 is injected into the main stream of the nozzle 61 to regulate the flow of fluid through the sonic orifice of the nozzle. A wall 63 is provided downstream of the inlet nozzle 61 to redirect the flow to plural receiving ducts 64 and 65. The wall 63 and the receiving ducts 64, 65 serve as a gas-liquid signal separator since the higher density liquid is directed by centrifugal force to the outside receiving chamber 64 developing output signal A, whereas the lighter density gas is received by the inner receiving ducts 65 as the stream is redirected by said wall 63 and develops output signal B. This particular arrangement is also very useful where the output signal is desired to be in substantially single fluid form rather than in multifluid form, since the output from either channel 64 or 65 can be utilized separately. As will be understood, the propagation time in both channels 64 and 65 are unequal and will be regulated by the amount of secondary fluid injected at the control nozzle 62 and by the degree of separation provided by the curvature of wall 63. Variation of the sonic speed of the nozzle 61 will cause modulation of the pressures developed in channels 64 and 65 and either or both channels may supply fluid to a further processing device or other means such as the control passage of a fluid amplifier of any of the types set forth herein.

Figure 7:
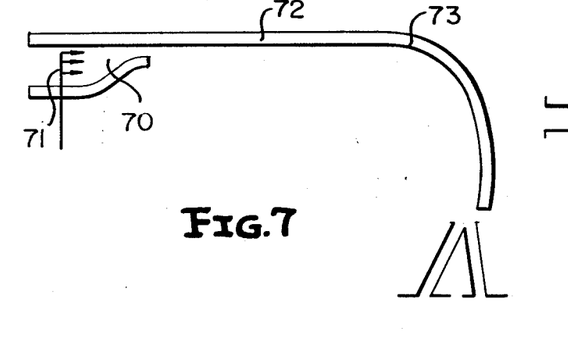
FIGURE 7 is a modification of FIGURE 6 particularly adapted for use with a liquid as the main fluid.

Referring now specifically to FIGURE 7 of the accompanying drawings, there is illustrated a modification of the apparatus of FIGURE 6. The apparatus of FIGURE 6 is primarily intended to be employed with a system having a gas as the primary fluid and a liquid as the injected fluid. However, if the primary fluid is to be a liquid, the system of FIGURE 6 is operable, but the system of FIGURE 7 operates better. It will be noted that basically the only difference between the two systems is that the wall 63 of FIGURE 6 has been extended all the way back to the primary fluid supply nozzle. More particularly, the system is provided with a nozzle 70 and an injector 71 for introducing a gas. A wall 72 extends from and actually forms one wall of the nozzle 70 and extends linearly to a point 73 and thereafter is curved downwardly as illustrated in FIGURE 7 to a region adjacent two receivers 74 and 76.

It will be noted that, in FIGURE 6, the mixture traverses open space and, if a system employing primarily water is utilized, the air in the space between the nozzle and the wall 63 can escape from either side of the stream of liquid. In actuality, in both of these devices, the stream is confined between two plates parallel to the plane of the device, i.e., plane of the page so that there would normally be no escape of fluid in directions perpendicular to the plane of the device.

In FIGURE 7, escape of gas to the region above the stream is prevented and gas can escape only into the region downwardly or below the stream of liquid. Thus, the separation effect produced by the wall 72 downstream of the point 73 is enhanced. In FIGURE 6, centrifugal force was employed to tend to maintain the liquid against the wall since the liquid is the heavier medium. In FIGURE 7, two separation effects are achieved, one due to the centrifugal forces, as in FIGURE 6, and the second due to the fact that gas can only escape to the region below the liquid stream which is the region where it is desired to collect the gas. Thus, there is a tendency in the region between the nozzle 70 and the point 73 of the wall 72 to stratify the gas and liquid columns which function is further enhanced in the curved region of the wall. Thus, separation of liquid and gas which it is desired to have occur between the channels 74 and 76 is enhanced, with the gas flowing primarily to the channel 74 and the liquid flowing primarily to the channel 76. In all other respects the apparatus of FIGURE 7 operates the same as the apparatus of FIGURE 6.

Figure 8:
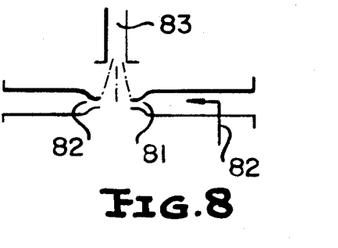
FIGURE 8 is a modification of the apparatus for utilization in impact modulators.

Referring specifically to FIGURE 8 of the accompanying drawings, there is illustrated an impact modulator to which the concepts of the present invention have been applied. In this device, a fluid stream is issued from a first nozzle 80 towards a second nozzle 81 which, in turn, issues fluid toward the nozzle 80. Secondary fluid may be introduced at the point indicated by the reference numeral 82 and the output signals may be derived at the output passages 83, 84.

The apparatus is operated with the nozzle 81 at the choke flow condition so that variations in the flow rate through the nozzle 81 may be controlled by introducing secondary fluid through the device indicated by the numeral or arrow 82. Changes of flow rates through the nozzle 81 varies the momentum (both the density and velocity) of the stream issued by nozzle 81 and shifts, relative to the output passages 83, 84, the centerline of the impact pattern, i.e., highest pressure point in the flow which results from impacting the oppositely directed streams.

The use of the principles of the present invention in an impact modulator simplifies the problem of introducing the control signal since each of the nozzles 80 and 81 may be connected to a common supply source and control signals in this case are introduced only by the introduction of the fluid through the apparatus indicated by arrow 82.

Figure 9:
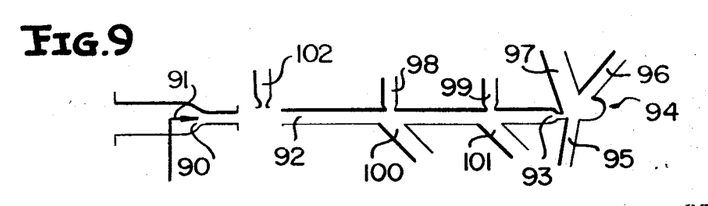
FIGURE 9 is an adaptation of the apparatus as a variable delay line.

Referring now specifically to FIGURE 9 of the present invention, there is illustrated an apparatus for employing the present invention to vary the time delay through a delay line. It will be noted that, in FIGURE 4, the variable delay line principle has been applied to an oscillator. In FIGURE 9, the apparatus is applied to any type of delay line in general and permits, as will be indicated subsequently, certain timing functions which might not otherwise be obtainable. Specifically, the apparatus is provided with a nozzle 90 into which a secondary fluid may be introduced by a nozzle or ejector 91. The fluid issued by the nozzle 90 is directed to a relay line 92 which terminates in a control nozzle 93 of a pure fluid amplifier 94 of the beam deflection type. The amplifier comprises a power nozzle 95 and output passages 96 and 97. The amplifier 95 is an OR/NOR gate in that, if fluid is not applied to the nozzle 93, the power stream normally is directed to the output passage 97, the NOR passage, whereas if fluid is applied to the nozzle 93, the fluid is directed to the output passage 96 which is the OR passage. The time at which a pulse, generated at the nozzle 90 is presented to the amplifier 94 is a function of the length of the delay line 92 and the velocity of signal propagation through the fluid within the delay line 92. As previously indicated, by operating the nozzle 90 in a choked condition, a first predetermined velocity of the fluid introduced to the delay line is established. Now by introducing a secondary fluid, the velocity of the fluid applied to the delay line 92 is reduced and the speed of sound of the mixture within the delay line is reduced. As a result of each of these factors independently and collectively, the timing of the delay line is extended. The degree of extension of the time of travel of a fluid pulse through the delay line 92 is a function of a quantity of fluid being introduced by the injector 91 and a function of history as represented by the mixture of fluid within delay line 92.

It will be noted that the delay line may be provided with a plurality of control nozzles 98 and 99 disposed opposite passages 100 and 101, respectively. In the digital operation of such a device, it is assumed that at a time $t_1$, a pulse of fluid is applied to the nozzle 90. At times $t_2$ and $t_3$, pulses are applied to control nozzles 98 and 99. In the operation of this system, for instance, if no secondary fluid is applied through the injector 91, the fluid pulse developed by the nozzle 90 proceeds to the nozzle 93 prior to the time $t_2$. If a specific quantity of fluid is introduced through the injector 91, the fluid pulse appears opposite or in the region of the nozzle 99 at the time $t_2$ and the fluid is diverted to the output passage 101. If an additional quantity is provided through the injector 91, the pulse is opposite the nozzle 98 at the time $t_3$. Any other quantities of injected fluid place the pulse, produced by the nozzle 90, at some location different from nozzles 98 or 99 and thus, the fluid pulse is presented to the nozzle 93.

A device of this type is useful in time or synchronizing functions. Under specified conditions, which are indicated by the quantity of flow to the injector 91, a fluid pulse is applied to the amplifier 94 and flow through this member is out through the output passage 96 at specified times in a cycle. However, if either of one or two different occurrences are encountered which cause appropriate amounts of fluid to be introduced through the injector 91, flow to the amplifier 94 is inhibited and the power stream for the nozzle 95 cannot be diverted to the output passage 96. It may be, in a given system, that flow to the output passage 96 is required to maintain a given position or conversely flow to the output passage 96 may indicate an objectionable condition which is to be corrected.

Flow from the passage 96 may be directed to an integrator and, if pulses are not applied thereto at the proper rate, as provided by the rate of pulses generated by the nozzle 90, the pressure level in the integrator falls below an established level and indicates a need for a correction. Conversely, if the pressure in the integrator rises above a certain level, indicative of the pulses being applied to the nozzle 93 only some of the time, as indicated correction could be applied.

The above situation is useful in that it does not require a change in the rate of pulses developed by the nozzle 90 but permits an analog signal developed or applied to the injector 91 to control what is essentially a digital control function. On the other hand, the apparatus of FIGURE 9 may be employed simply to change the delay through the pipe 92 with variations in signal level being introduced by a nozzle 102. Under these circumstances, the time constant of a circuit may be varied relative to signals introduced through the injector 91. This is particularly useful in phase comparison circuitry wherein signal 91 provides a time shift of the fluctuating signal introduced by nozzle 102.

Figure 10:
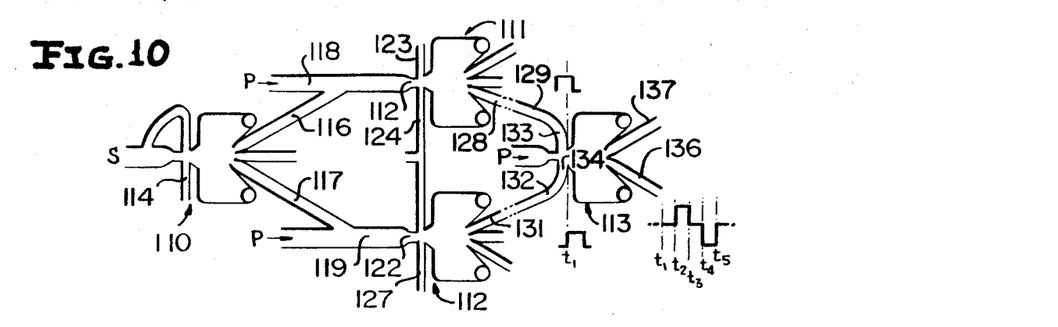
FIGURE 10 is an embodiment of the invention employing delay lines for use in a differentiator circuit.

Referring now specifically to FIGURE 10 of the accompanying drawings, the variable delay line principle set forth in FIGURE 9 is employed in an active differentiator circuit as illustrated in FIGURE 10. In FIGURE 10, there is provided a first fluid amplifier 110, a second fluid amplifier 111, a third fluid amplifier 112 and a final or fourth fluid amplifier 113. The amplifier 110 is connected to a source of secondary fluid while the amplifiers 111, 112 and 113 are connected to sources of primary fluid. A time-delay-control signal is connected to a control nozzle 114 of the amplifier 110 to vary the quantities of secondary fluid connected to output passages 116 and 117, respectively of the amplifier 110.

The output channels 116 and 117 are connected to passages 118 and 119, respectively, to which is applied a primary fluid as indicated by the letter "P" placed in the ingress end of each of these passages. The passage 118 is connected to a power nozzle 121 of the amplifier 111 while the passage 119 is connected to a power nozzle 122 of the amplifier 112. The flow velocities and mass flow rates through the nozzles 121 and 122 vary as a function of the quantity of secondary fluid applied to each of passages 118 and 119, respectively, in response to the signal applied to the control nozzle 114 of the amplifier 110. Amplifier 111 is provided with control nozzles 123 and 124 and the amplifier 112 is supplied with control nozzles 126 and 127. The amplifiers 111 and 112 are connected to receive a push-pull command signal, with the nozzles 124 and 126 being connected to receive, for instance, the "push" end of a command signal, and the nozzles 123 and 127 being connected to receive the "pull" end of a control signal. Specifically, the push-pull control signal may be provided by a dual output channel, fluid amplifier with one of the output channels connected to nozzles 124 and 126 and the other channel connected to nozzles 123 and 127.

An output channel 128 of the amplifier 111 is connected to a delay line 129 while an output channel 131 of amplifier 112 is connected to a delay line 132. Delay line 129 is connected to a control nozzle 133 of amplifier 113 while the delay line 132 is connected to a second control nozzle 134 of the amplifier 113.

In operation, assume, for purposes of illustration only, that a pulse is applied and a time $t_1$ to control nozzles 124 and 126 of amplifiers 111 and 112, respectively. It is further assumed that the quantities of secondary fluid applied to the passages 118 and 119 are different. Under these circumstances, the delay through the delay lines 129 and 132 are different and under the situation assumed, the pulse applied to the amplifier 111 proceeds through the delay line 129 faster than through the delay line 132 and thus initially produces switching of the output stream of the amplifier 113 to a first output channel 136 thereof at a time $t_2$. After a predetermined time delay the pulse proceeding down the delay line 132 arrives at the control nozzle 134 at a time $t_3$. Since the pulses in both of the delay lines are of substantially equal amplitude, the power stream flows equally to both output channels 136 and 137. At time $t_4$, the flow to the control nozzle 133 of the amplifier 113 terminates, but the flow to the nozzle 132 continues, thus the fluid is now directed to the output channel 137 and the flow to the channel 136 is terminated. At a time $t_5$, the flow or pulse appearing in the delay line 132 terminates and the power stream of the amplifier 113 again divides equally between the passages 136 and 137. The pattern of flow to the output channel 136 is plotted immediately adjacent the end of this passage in FIGURE 10 and indicates that, in response to the input pulse, the flow to the channel 136 appears initially as an increase in flow for the period between $t_2$ and $t_3$; a normal or divided flow occurs between the times $t_3$ and $t_4$; and a decrease in flow occurs during the period $t_4$ to $t_5$. Thus, the pattern of pulses is a generally classic pulse or waveform for a differentiated pulse and it is apparent that the apparatus provides an active differentiator circuit.

The above operation, of course, assumes that all path lengths through the system of FIGURE 10 are equal, which is the intention of the aforesaid drawing. The amplitude of the output signal, which may appear at the passage 136, passage 137 or as a differential in pressure between the two passages, depends upon the rate of change of the push-pull command signal and the relative speed of sound in the delay lines. Since these speeds of sound are controllable, the sign of differentiation is controllable. Similarly, the difference of the two speeds of sound provides control of the gain factor or degree of differentiation for a given rate of change of the command signal. Thus, it becomes apparent that this device has utility in comparator or control systems which include solutions of calculus-type equations and is also useful in adaptive control systems.

Figure 11:
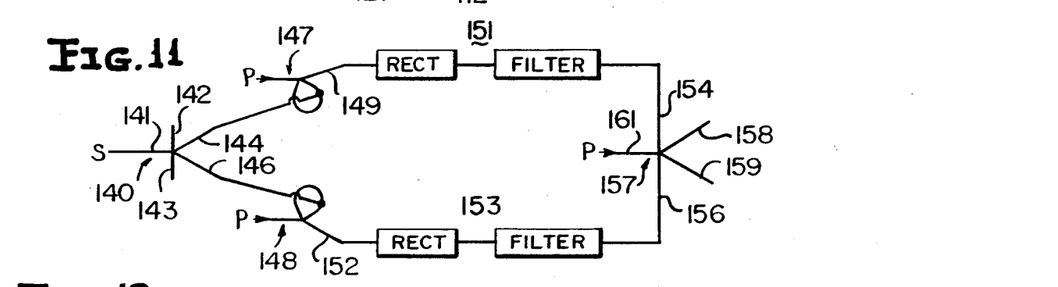
FIGURE 11 is an embodiment of the invention for producing variable frequency trains and comparing same.

Referring now specifically to FIGURE 11 of the accompanying drawings, there is illustrated a system for providing an analog output signal proportional to the difference or beat frequency of oscillation of two oscillators. A first amplifier 140 has a power nozzle 141 adapted to receive a secondary fluid. Control signals are applied to opposed control nozzles 142 and 143 of amplifier 140 to vary the proportions of secondary fluid applied to output passages 144 and 146 thereof. The secondary fluid flows appearing in the passages 144 and 146 are connected to supply the fluid to the feedback path of two oscillators 147 and 148, respectively. The oscillators 147 and 148 are of the type illustrated in FIGURE 4 of the accompanying drawings.

Output signals appearing in an output channel 149 of the oscillator 147 are applied to a rectifier-filter arrangement 151 which may be of the type illustrated in FIGURE 1 of the copending application Ser. No. 293,108, filed on July 5, 1963, by John R. Colston, and assigned to the same assignee as the present invention. Output signals appearing in output channel 152 of the oscillator 148 are applied to an identical rectifier filter arrangement 153 and output signals from the two rectifier filter arrangements 151 and 153 are applied to opposed control nozzles 154 and 156, respectively, of a summing amplifier 157. Output signals appear in output channels 158 and 159 of the amplifier 157 whose power nozzle 161 is connected to receive primary fluid.

The oscillators 147 and 148 have, in the absence of secondary fluid, identical frequencies of operation. Thus, the signals applied from the filters 151 and 153 to the amplifier 157 are identical in magnitude and the output flows appearing in the output passages 158 and 159 of the summing amplifier 157 are identical. If now the power level signal of nozzle 141 is increased, the frequency of oscillation of the oscillators 147 and 148 change, but they change by an identical amount so that the output signals of the system still remain the same in the absence of a difference between control signals 142 and 143. However, if a push-pull control signal is applied to the controls 142 and 143 of the amplifier 140, different quantities of secondary fluid are introduced into the feedback paths of the oscillators 147 and 148 and their frequencies of oscillation change. Under these circumstances, the output flow from the rectifier filter arrangements 151 and 153 are different and the fluid flows to the passages 158 and 159 of the amplifier 157 are different, and are a function of the signals applied to the control nozzles 142 and 143 of the amplifier 140. A condition sensor may be connected to provide a push-pull signal to the nozzles 142 and 143 and the differential in pressure between the final output channels 158 and 159 is a function of the condition detected by the condition sensor.

Figure 12:
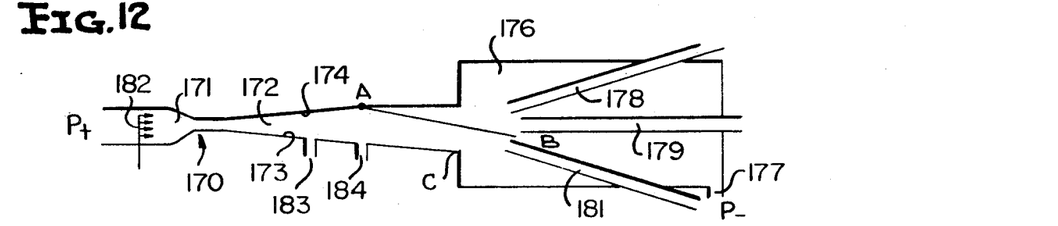
FIGURE 12 is a modification of the invention as employed with supersonic nozzles.

Referring now specifically to FIGURE 12 of the accompanying drawings, there is illustrated a further system for employing the concepts of the present invention. The apparatus is provided with a supersonic nozzle 170 having a converging portion 171 and a diverging portion 172. A lower wall 173 of the diverging portion of the nozzle continues along an essentially straight diverging line; that is, a line directed downward to the right as illustrated in FIGURE 12 to a point C. An upper wall 174 of the diverging portion 172 of the nozzle diverges to a point A and thereafter extends to a point opposite the point C along a line generally parallel to the direction of the fluid in the nozzle throat.

The diverging portion 172 of the nozzle 170 terminates in a chamber 176, the pressure of which is maintained at a minus pressure by connection to a variable source of reduced pressure through a passage 177. The device may be provided with three output passages 178, 179 and 181 with the region around and/or between the passages being at a pressure determined by the P— source. A positive pressure P applied to the nozzle 170 maintains supersonic flow in at least a portion of the nozzle through all conditions of operation. Secondary fluid may be introduced through an injector 182.

The primary source of fluid is gas and, under normal conditions of operation, an oblique shock wave is produced having a wave front extending nominally along a line A–B. Where an oblique shock wave is established, as indicated above, the pitot pressure detected by the passage 178 is higher than the pitot pressure detected at the passage 181. Thus, a differential in pressure exists between the passages 178 and 181. For the case where the oblique shock wave is of moderate or weak strength if a secondary fluid is introduced through the injector 182, the flow through and speed of sound in the nozzle 172 decreases and the specific heat ratio $\delta$ decreases and the oblique pressure wave front A–B rotates counterclockwise about the point A indicating a weaker shock wave. As the shock wave becomes weaker the differential pressure developed between the passages 178 and 181 decreases and as the pressure wave becomes stronger and rotates clockwise about the point A, indicating a decrease in the amount of fluid injected through injector 182, the pressure difference between the passages 178 and 181 increases. Thus, the differential in pitot pressure as between the passages 178 and 181 is a function of the amount of secondary fluid introduced through the injector 182.

The differential in pressure between the passages 178 and 181 may also be varied by varying the P— pressure maintained in the chamber 176. As this pressure is raised, the oblique shock wave becomes stronger and the difference pressure between the passages 178 and 181 increases. As the P— pressure is decreased, in other words, becomes less relative to the P+ pressure, the oblique shock wave becomes weaker and the difference of pitot pressures detected by the passages 178 and 181 becomes smaller. Thus, either of two types of signals may be applied to the apparatus of FIGURE 12. Further, one or the other of the signals may be employed in effect as a range switching signal. Thus, by introducing a fixed quantity of fluid through the injector 182 and varying P—, a certain range of P— signals may be investigated. A different range may be investigated by changing the fixed quantity of fluid applied by the injector 182. Conversely, range switching may be effected by selecting a value of P— which produces the requisite operation over a range of values indicated by the signal applied to the injector 182 and this range of signals may be varied by changing the value of P—.

The apparatus of FIGURE 12 may be employed for an entirely different type of operation in that it may be made to operate with normal shock waves only. In this instance, P— is adjusted to produce a normal shock wave at some point upstream of the point A. The position of the shock wave relative to this normal position, can be varied by the quantity of fluid injected through the injector 182. It is known that the pressure change across a normal shock wave is a function of the Mach number at which the shock occurs and that this is related to the position of the shock relative to the throat of the nozzle. In the case of multiphase fluid flow, the position in which the shock occurs varies as a function of the sonic velocity of the fluid. The sonic velocity of the fluid is modified when fluid is introduced through the injector 182 and thus the position at which the shock occurs and therefore the pressure change across the shock may be varied in accordance with this input signal and this may be sensed by the output tube 179.

The position of the shock wave relative to a predetermined range of positions may be determined by a pair of static pressure tubes 183 and 184. If the amount of fluid introduced through the injector 182 is such that the shock wave occurs to the left of the tube 183, then the tubes 183 and 184 read substantially equal pressures. However, if the amount of fluid introduced through the injector 182 is such that the shock wave occurs between the position of the two tubes 183 and 184, a large differential in pressure is detected at the tube 184 reading higher than tube 183 and indicating that the amount of fluid introduced through the injector 182 is within a specific range. If the shock wave occurs downstream of (to the right of) tube 184, the difference between pressures 183 and 184 will be small with 184 at a lower pressure than 183.

An advantage of the apparatus of FIGURE 12 is the very large gains which are obtained. Specifically, gains of the order of 1000 are available; that is, the change in pressure as between any of the various sensing elements as a condition is changed will be of the order of a thousand times greater than the corresponding change in pressure required to produce the change in signal level; that is, the change in fluid introduced through the injector 182.

Figure 13:
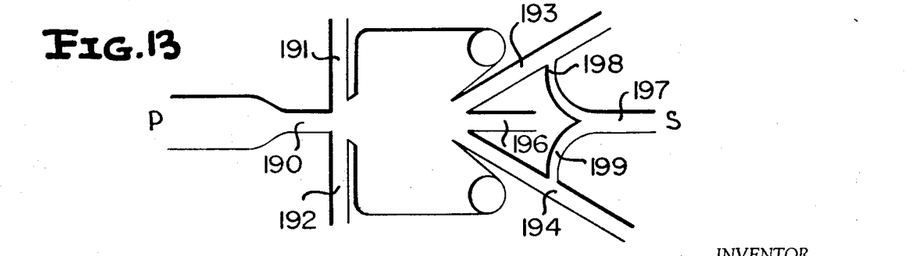
FIGURE 13 is a modification of the invention for use in adaptive control systems.

Referring now specifically to FIGURE 13 of the accompanying drawings, there is illustrated a further system which is specifically designed to be employed in an adaptive system. Such systems having been previously mentioned in this specification. The apparatus comprises a conventional analog amplifier having a power nozzle 190, control nozzles 191 and 192 and output passages 193 and 194 and a center vent output pasage 196. A source of secondary fluid is connected to a passage 197 which is connected through channels 198 and 199, respectively, into the output channels 193 and 194. The fluid in the channel 197 is normally at ambient pressure; that is, is not pressurized and does not normally flow into the channels 193 and 194 in a physical embodiment of the apparatus. The passage 197 may be located below the level of the passages 193 and 194.

In this apparatus, in the absence of an input signal, fluid flows primarily through the vent passage 196 and is dumped with small quantities of fluid flowing to the passages 193 and 194. Under these circumstances, the flow rates through these passages are sufficiently small that very little, if any, fluid is entrained from the supply 197 through the channels 198 and 199. If now, however, a signal is applied, for instance, to the control nozzle 191, the quantity of fluid directed to the passage 194 is increased, and the rate of entrainment of fluid from channel 199 increases or if there has been no previous entrainment, entrainment commences. The velocity of the signal propagation through the fluid mixture in downstream regions of channel 194 is now decreased gradually relative to its initial flow rate to a new level dependent upon the entrainment rate corresponding to the level of the signal of nozzle 191. This gradual change in signal propagation rate is a history function and is of use in many adaptive systems as for example in an aircraft control system. Assume for instance, that an aircraft initially deviates rapidly to the left from a prescribed course. This fact produces a rapid and large increase in the amount of fluid flow to the channel 194. This rapid increase in flow is transmitted through the channel 194 to a controller which introduces a relatively large initial control signal. If the error is immediately rectified, the decrease signal will be propagated through channel 194 at approximately the same speed as was the increase signal. However, the longer signal 194 is maintained the lower the signal propagation speed in channel 194 and the more slowly the propagation rate of the decrease signal when it is called for. The amplitude of signal 194 places a floor on the minimum propagation rate by establishing the final steady state rate of entrainment of secondary fluid. This entrainment decreases the signal propagation rate in the channel 194 thereby automatically decreasing the dynamic response to fluctuation of the signal being applied. Thus, the apparatus applies an initial large correction and thereafter reduces speed of response to signal fluctuations and subsequent signal removal automatically by entrainment of secondary fluid so as to damp the system and prevent dangerous overshooting while at the same time permitting a rapid response to the initial change of conditions. The opposite leg 193 remains at a maximum signal transmission speed condition until flow of nozzle 190 is delivered to channel 193.

The operation of the device is, of course, identical if the control signal is applied to the control nozzle 192.

It is thus apparent that the device of the present invention has many useful applications in many pure fluid control elements and circuits, where modulation in terms of mass flow, propagation time, and fluid velocity are desired. Other results and advantages will now also be apparent in terms of the simplicity of design which feature adds to the unit's reliability and cheapness of manufacture, which compare very favorably with other pure fluid devices. Most importantly, as well illustrated in FIGURE 1, in certain modes of operation only a small injection of secondary fluid (from zero to 1% in the case described) is required to modulate the desired parameter (velocity, mass flow and propagation time) to a major extent thereby rendering the unit very sensitive and highly efficient.

What I claim is:

1. A method of modulating fluid flow in a fluid stream comprising the steps of accelerating said stream in a throat region to Mach I velocity thereby establishing a predetermined velocity and mass flow rate, and introducing into said stream upstream of said throat region a selective variable quantity of control material having a Mach I characteristic different from said fluid whereby the mixture of said fluid and material has a Mach I velocity and corresponding mass flow rate different from said predetermined values.

2. The method of claim 1, wherein said fluid is injected substantially centrally of said stream.

3. A fluid modulator comprising a duct having an unobstructed throat section, fluid pressure means associated with said duct providing a pressure ratio across said throat section sufficient to generate a stream of fluid having Mach I velocity at said throat section thereby establishing predetermined flow conditions at said throat, and injection means upstream of said throat section for introducing into said stream control material having a Mach I characteristic different from said fluid whereby the mixture of said fluid and said material has a Mach I velocity and corresponding flow conditions in said throat different from said predetermined values.

4. The combination according to claim 3 wherein said stream comprises water and said material comprises air.

5. The combination according to claim 3 wherein said injection means is positioned generally centrally of said duct.

6. The combination according to claim 3 wherein said duct includes a vortex chamber.

7. The combination according to claim 3 wherein said injection means includes means for producing foaming of said control material.

8. The combination according to claim 3 wherein is further provided a curved wall having one end directed toward said duct for receiving said mixture and redirecting same, a first receiving channel directed toward the other end of said wall to receive a portion of said mixture, and a second receiving channel adjacent said first receiving channel and directed in generally the same direction as said first channel to receive another portion of said mixture.

9. The combination according to claim 8 wherein said wall extends from a point immediately adjacent said throat section and wherein said fluid of said stream is a liquid.

10. A delay line having a variable time delay comprising a nozzle, means for producing flow of a first fluid through said nozzle at Mach I velocity for said first fluid, a fluid delay line comprising an elongated passage, said delay line being positioned to receive fluid from said nozzle, and means for varying the transit time of said fluid through said delay line, said means including means for injecting into said first fluid upstream of said nozzle a material having a Mach I velocity different from said first fluid.

11. A fluid impact modulator comprising a pair of channels for issuing two generally coaxial streams of a first fluid toward and into impact with one another, one of said channels including a throat section, means for establishing flow through said one of said channels to establish a flow velocity of Mach I for said first fluid in said throat, a receiver for said impacted fluid and means for introducing into said one of said channels upstream of said throat a second fluid having a Mach I velocity different from said first fluid.

12. A pure fluid device comprising a fluid amplifier having opposed control nozzles, a pair of delay lines each connected to a different one of said control nozzles, means for introducing fluid into said delay lines and fluid means for differentially varying the sonic velocity of the fluid in each of said delay lines as a function of a control signal.

13. The combination according to claim 12 wherein said means for introducing fluid into said delay lines each comprises a passage having a throat therein; means for establishing flow of fluid through said throat at Mach I for said fluid and wherein said fluid means includes means for introducing upstream of said throat a second fluid having a different Mach I velocity from said first-mentioned fluid.

14. A fluid amplifier apparatus comprising a fluid analog amplifier having a means for issuing a stream of a first fluid, having a predetermined Mach I velocity, a pair of output passages and means for varying the proportions of fluid directed to said output passages; and means connected to each of said output passages for supplying a second fluid thereto as a variable function of flow through each of said output passages, of said first fluid, said second fluid having a different Mach I velocity from said first fluid.

15. A fluid system comprising a converging-diverging supersonic nozzle, means for introducing a first fluid into said nozzle at such a pressure as to develop Mach I flow for said first fluid through the narrowest region of said nozzle, means for introducing a second fluid upstream of the narrowest region of said nozzle, said second fluid having a different sonic velocity from said first fluid, said diverging portion of said nozzle establishing a shock wave in said nozzle and means for determining the strength of said shock wave.

16. A method of modulating fluid flow in response to a signal comprising the steps of accelerating a main stream in a throat region to Mach I velocity thereby establishing a predetermined velocity and mass flow rate through the throat region, introducing into said stream upstream of said throat region, a fluid having a Mach I characteristic different from said stream and varying the rate of flow of fluid into the stream as a function of said signal whereby mass flow is modulated as a function of said signal.

17. The method of claim 16, wherein said main stream is water and said fluid is air.

18. The method of claim 17, wherein said fluid is injected substantially centrally of said stream.

19. A turbulence amplifier comprising a passage means for introducing a first fluid to one end of said passage at a Reynolds number such that the flow from the other end of said passage is laminar, a receiver located downstream of and spaced from said passage so as to receive said laminar stream and means for mixing with said first fluid upstream of said passage a second fluid having a higher Reynolds number than said first fluid, whereby the Reynolds number of the mixture of fluids is raised above that of said first fluid.

20. The combination according to claim 19 further comprising means for introducing a flow of said second liquid such that said flow from said passage becomes turbulent prior to arriving at said receiver.

21. A variable frequency oscillator comprising means for issuing a stream of a first fluid in a first direction, said first fluid having a predetermined sonic velocity, a feedback path for directing a portion of said stream against said stream for directing said stream in a second direction, and means for redirecting said stream in said first direction when flow in said feedback means has reduced below a prescribed minimum, and means for varying the frequency of said oscillator comprising means for introducing into said feedback path variable quantities of a second fluid having a different sonic velocity from said first fluid.

22. A beat frequency detector comprising first and second oscillators as defined in claim 21, said fluid flow means comprising means for introducing differentially related quantities of said second fluid into said feedback means and means for determining the difference in frequencies of said first and second oscillators.

23. A fluid modulator comprising a duct having an unobstructed throat section, fluid pressure means associated with said duct providing a pressure ratio across said throat section sufficient to generate a stream of fluid having Mach I velocity at said throat section thereby establishing predetermined flow conditions at said throat, means for producing selectively variable flow rate of a second fluid, means for mixing said second fluid with said stream of fluid upstream of said throat, said second fluid having characteristics such that the mixture of said stream of fluid and said second fluid has a Mach I velocity different from that of said stream of fluid.

24. The combination according to claim 23 further comprising a convex wall located such that fluid issuing from said throat section is directed to said wall and redirected thereby, a first passage generally in line with an end of said wall remote from said duct, a second passage adjacent said first passage in a common plane with said first passage and said duct and walls confining fluid flow to said common plane.

25. The combination according to claim 24 wherein said stream of fluid is a liquid.

26. A vortex throttle comprising a vortex chamber having an input duct and an egress orifice, means for introducing a first fluid into said chamber at such a pressure and location as to establish sonic vortical flow conditions in said vortex chamber, and means for mixing with said first fluid in said chamber a second fluid having a characteristic such that the sonic velocity of the mixture is less than the sonic velocity of said first fluid.

27. The combination according to claim 26 wherein said first fluid has a higher density than said second fluid.

28. A fluid impact modulator comprising a pair of generally coaxial channels for issuing two streams of a first fluid, said streams being at the sonic velocity of said first fluid at their point of issue and being directed toward and into impact with one another, said two streams initially having substantially the same momenta, a passage mutually perpendicular to said channels and spaced a specified distance from the coaxis of said channels, and means for modulating the momentum of at least one of said streams comprising means for mixing with said first fluid flowing in one of said channels a fluid having a sonic velocity different from the sonic velocity of the fluid of said two streams.

29. The combination according to claim 28 wherein said one of said channels has a throat region therein, and means for establishing sonic flow in said throat in the absence of said second fluid.

30. A fluid delay device comprising an elongated fluid conduit, a power nozzle for issuing a stream of a first fluid into one end of said fluid conduit, means for sensing flow at the other end of said fluid conduit, means located upstream of said power nozzle for mixing into said first fluid a second fluid having a different sonic velocity from the sonic velocity of said first fluid, means for varying the quantity of said second fluid introduced into said first fluid and control means varying the quantity of fluid issued by said nozzle which travels through said conduit to said means for sensing.

31. The combination according to claim 30 wherein said control means comprises means located between said delay line and said one end of said conduit for deflecting said stream.

32. The combination according to claim 30 wherein said fluid conduit has at least one branch conduit, a control nozzle for issuing a stream to deflect fluid from said fluid conduit into said branch conduit, means for applying periodic pulses of a first fluid to said power nozzle and means for applying periodic pulses of fluid to said control nozzle whereby pulses of fluid emitted by said power nozzle are transmitted to said means for sensing in dependence upon the sonic velocity of said stream of fluid as determined by the quantity of said second fluid mixed with said first fluid.

33. A dual fluid system comprising a first fluid amplifier having a power nozzle for issuing a stream of fluid, a pair of output passages for receiving said stream of fluid and control means for varying the distribution of said stream fluid between said output passages, and supply means for supplying a first fluid under pressure to said power nozzle, a second fluid amplifier, having a power nozzle for issuing a stream of fluid, a pair of output passages for receiving said stream of fluid and a control means for varying the distribution of said stream between said output passages of said second fluid amplifier, one of said output passages of said second amplifier being connected to said supply means to mix fluid flowing therein with fluid flowing in said second amplifier and means for supplying a second fluid under pressure to said power nozzle of said second amplifier, said second fluid having a different sonic velocity from said first fluid.

34. The combination according to claim 33 further comprising a third fluid amplifier having a power nozzle, a pair of output passages and control means, a supply means for supplying said first fluid to said power nozzle and means connecting the other of said output passages of second amplifier to said means for supplying fluid to said third amplifier.

35. The combination according to claim 34 further comprising a fourth amplifier having a power nozzle, a pair of output passages and a pair of control nozzles, a delay line extending between one output passage of each of said first and third amplifiers and a different control nozzle of said fourth amplifier and means for concurrently pulsing said control means of said first and third amplifiers.

References Cited

UNITED STATES PATENTS

| | | | |
|---|---|---|---|
| 2,173,330 | 9/1939 | Gregg | 230—95 |
| 3,075,548 | 1/1963 | Horton | 137—81.5 XR |
| 3,124,153 | 3/1964 | Lovelace | 137—312 |
| 3,155,825 | 11/1964 | Boothe | 137—81.5 XR |
| 3,174,497 | 3/1965 | Sowers | 137—81.5 |
| 3,182,674 | 5/1965 | Horton | 137—81.5 |
| 3,212,515 | 10/1965 | Zisfein et al. | 137—81.5 |
| 3,234,955 | 2/1966 | Auger | 137—81.5 |
| 3,267,946 | 8/1966 | Adams et al. | 137—81.5 |
| 3,272,215 | 9/1966 | Bjornsen et al. | 137—81.5 |
| 3,273,377 | 9/1966 | Testerman et al. | 137—81.5 XR |

FOREIGN PATENTS

| | | |
|---|---|---|
| 562,578 | 5/1957 | Italy. |
| 613,144 | 1/1961 | Canada. |

SAMUEL SCOTT, Primary Examiner